May 5, 1942.  R. A. STEPS  2,281,632
JACKET FOR DRILL PIPE COUPLINGS
Filed Dec. 5, 1939  2 Sheets-Sheet 1

May 5, 1942.  R. A. STEPS  2,281,632
JACKET FOR DRILL PIPE COUPLINGS
Filed Dec. 5, 1939  2 Sheets-Sheet 2

Inventor
Robert Alexander Steps

Patented May 5, 1942

2,281,632

UNITED STATES PATENT OFFICE 2,281,632

JACKET FOR DRILL PIPE COUPLINGS

Robert Alexander Steps, Los Angeles, Calif.

Application December 5, 1939, Serial No. 307,708

11 Claims. (Cl. 308—4)

This invention relates to a protective cover or jacket for the conventional coupling used in joining together the sections of drill pipe which comprise the drill stems used in drilling deep wells.

Although protective coupling jackets have been proposed before, their form or mode of installation on the coupling has for one reason or another been objectionable or inadequate. Consequently, in drilling wells it is common practice today to not protect the drill stem couplings, and these couplings, and also the conventional tool joints with which they alternate, therefore become worn by unavoidably rubbing against the open hole in which they run, or by rubbing against boulders or rocks that project from the walls of the hole. These unprotected drill stem couplings gradually become weakened as they wear, and eventually leakage develops because of the high pressure of the mud which the drill stem conducts from the surface of the earth to the drill at the bottom of the stem. These mud pressures in the drill stem are often far in excess of 1000 pounds per square inch, which indicates the pressure on the couplings and the general nature of the problem. Furthermore, the wear on the couplings, in addition to inducing leakage, also causes general mechanical weakening of the entire drill stem, all of which causes considerable trouble and expense in replacing the worn couplings, the worn tool joints, and even occasionally sections of the drill pipe because the threaded ends of the pipe become irreparably damaged by the blasting action of the high pressure mud as it leaks out at high velocity from the worn and weakened couplings.

It is an object of this invention to make available efficient and successful protective jackets for such drill stem couplings, in order thereby to prevent or retard the above mentioned wear on the couplings, and to eliminate or greatly reduce the aforesaid troubles and expense consequent thereto.

It is a further object to provide protective coupling jackets that can be easily installed and adequately secured to the couplings without impairing the coupling threads or their sealing power, remembering that these threads must transmit the great rotating forces that do the drilling and must also withstand the high mud pressures that exist inside the drill stem during drilling.

It is a further object to so organize these jackets that they can be readily and successfully installed while the coupling is joined in a string or stand of drill pipe with other couplings and tool joints therein, It is a further object to so utilize welding that these jackets can be successfully installed on and firmly secured to the coupling without deforming the coupling or its threads, or in any way interfering with the great holding and sealing power of the threads.

It is a further object to so install the jacket on the coupling that the arcuate jacket sections when joined together in final position on the coupling, will have within themselves a powerful tension drawing the coupling sections forcibly inward against the coupling to create a substantial frictional grip between the jacket and the coupling to resist slip or relative movement between these parts during operation.

It is a further object to secure the jacket sections to the coupling preferably by both welding and by frictional grip with the idea that the more frictional grip there is, the less welding of the jacket to the coupling will be needed, and consequently the less will be the possibility of damaging the coupling by the high welding temperatures, and yet the junction of these parts will be made positive by the welding.

It is a further object to secure the jacket sections to the coupling in such manner that when the jacket itself becomes worn it can readily be removed from the coupling to permit installation of another jacket thereon with minimum risk of damage to the coupling.

It is a further object to either totally or partially relieve the coupling and its threads of the excessive bending strains set up when the drill stem bends or whips around during drilling, this being accomplished by transferring all or a portion of these strains from the coupling to the jacket.

A further object is to increase the effectiveness of the tension that frictionally grips the jacket and coupling together, by interposing between these members a friction increasing material.

Another object is to provide coupling jackets that indirectly protect the more expensive and unprotected tool joints which alternate with the couplings according to some sequence.

Another object is to so form the interior surface of the coupling jacket as to concentrate its inwardly directed frictional grip onto the ends of the coupling over the effective threads to thereby reinforce these threads and strengthen them for their various duties.

In this specification, and in the accompanying drawings, I shall describe and show a preferred form of my invention, and also certain modifications thereof, and I will mention in connection therewith certain of the more important objects and advantages. I do not limit myself however to the precise forms disclosed, because various further changes and adaptations can be made without departing from the essence of my invention which is expressed in the appended claims. Also I wish to point out that objects and advantages that will be apparent to those skilled in the art are included within the scope of this invention even though same are not specifically mentioned herein.

In the accompanying drawings, like parts are designated by like reference numerals.

Figures 1, 2, 3, 10, 11, 12:
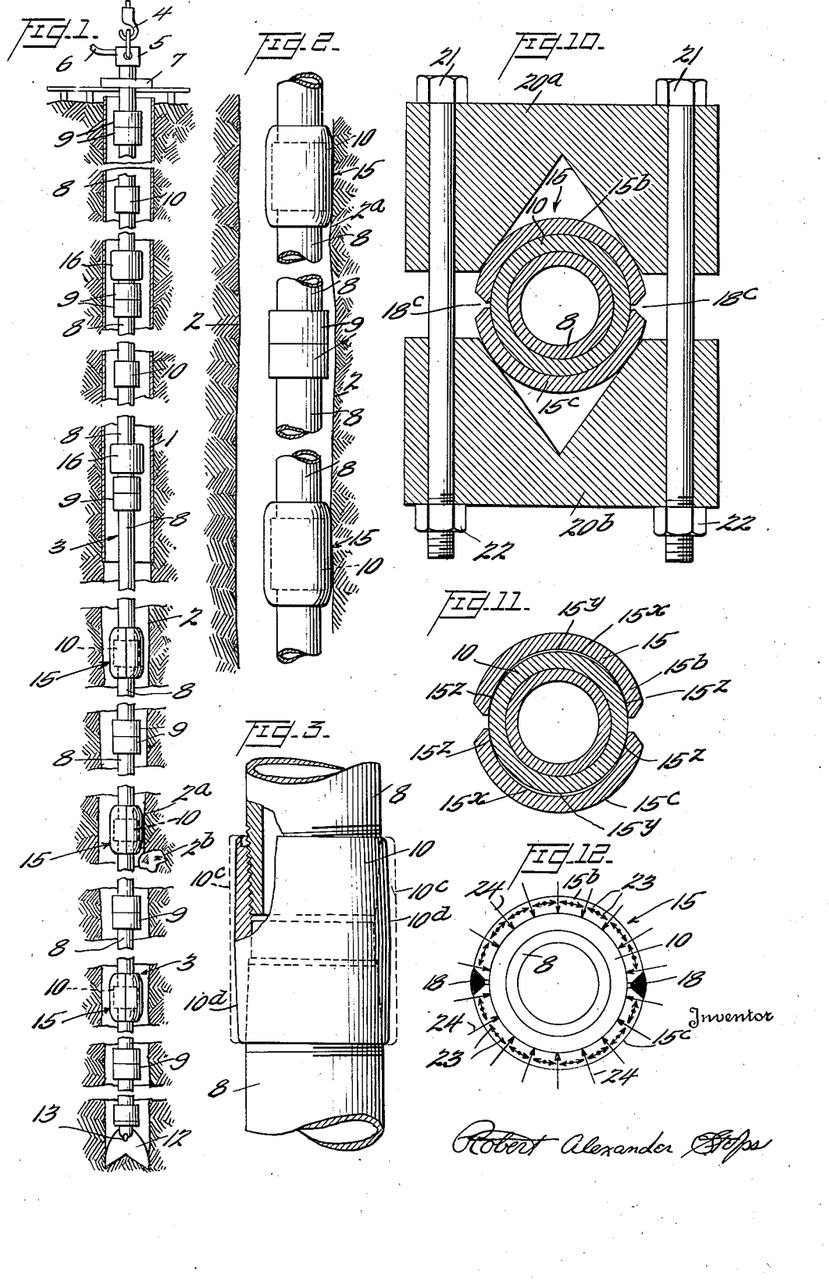
Fig. 1 is a vertical section of a well in the course of drilling, the drill stem being shown therein equipped with couplings having my coupling jackets thereon. In this figure, portions of the well and drill stem not pertinent to this invention are broken away in order to permit enlarged and clearer illustration of the parts that are pertinent hereto.
Fig. 2 is an enlarged view of a portion of the drill stem, the parts not pertinent being broken away for the same reason as mentioned in connection with Fig. 1.
Fig. 3 is an enlarged view of a conventional drill pipe coupling without a protecting jacket and illustrating the nature of the wear ordinarily encountered.
Fig. 10 illustrates a form of clamp which I use as one mode of applying the jacket sections to the coupling under hoop tension in connection with welding the jacket sections together.
Fig. 11 is a transverse section showing in exaggerated manner the internal diameter of the arcuate sections of my coupling jacket, in relation to the external diameter of the coupling itself, whereby the hoop tension in the jacket sections can be made more effective.
Fig. 12 is a diagrammatic view indicating the component forces that comprise the hoop tension in the coupling jacket on the coupling.

Figure 1 illustrates the well which at this stage of completion may have reached a depth of say 6000 feet, and the upper portion of this well is shown as already cased with steel casing 1 to a depth of perhaps 3000 feet, while below this casing is the open hole 2 which at this stage is uncased and extends down possibly another 3000 feet below casing 1.

In this well is shown the drill stem indicated generally by reference numeral 3, this drill stem being shown as associated at the top with such well known conventional mechanism as the tackle hook 4, the swivel 5, the hose 6 connected with the swivel, and the rotary table 7 for rotating the pipe, none of which mechanism need be further described here.

The drill stem proper consists of drill pipe sections or joints 8, about 20 feet long each, or somewhat longer, these sections being joined together alternately by tool joints 9 and pipe couplings 10. This alternation of tool joints, pipe sections, and couplings can be variously arranged and often comprises four sections of pipe 8, joined together by three of the couplings 10, and a tool joint 9 being then located at each end of this string or stand of four joints of pipe, or only two joints of pipe may be united by a coupling 10, and a tool joint 9 is then located at the end of each stand of two sections of pipe, or in other words, the tool joints and the couplings can alternate in various manners as may be desired, in making up the drill stem.

Figures 1A, 4, 5, 6, 7, 8, 9:
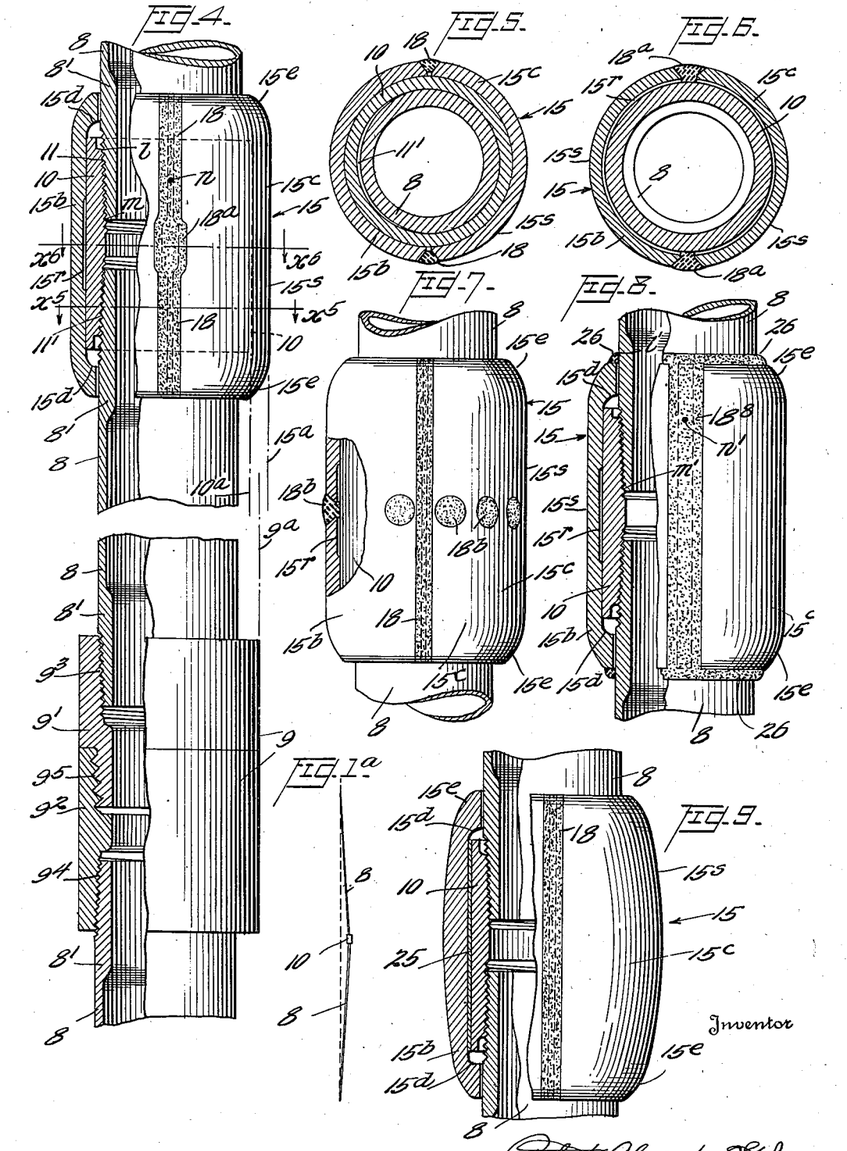
Fig. 1a, found on the second sheet of the drawings, is a diagrammatic view indicating the coupling strains sometimes imposed by the bending of adjacent joints of drill pipe during drilling.
Fig. 4 is an enlarged view partly in section of a portion of a drill stem showing a coupling protected with my coupling jacket, and also showing a conventional tool joint.
Fig. 5 is a transverse section along line $X^5$—$X^5$ of Fig. 4, looking in the direction of the arrows.
Fig. 6 is a similar transverse section along line $X^6$—$X^6$ of Fig. 4.
Fig. 7 illustrates a modification of my coupling jackets.
Fig. 8 illustrates another modification thereof.
Fig. 9 illustrates still another modification.

Although these couplings and tool joints are well known in the art, I have illustrated them more fully in Fig. 4. Here the conventional coupling 10 is shown as a cylindrical member having its opposite ends internally threaded by relatively fine screw threads 11 and 11' which are oppositely tapered in conventional manner to receive the externally threaded ends of two adjacent pipe joints 8; and the tool joint 9 is shown as comprising the usual upper pin member 9' and the usual lower box member $9^2$, each of these being internally threaded at their opposite ends by relatively fine oppositely tapered threads $9^3$ and $9^4$, these registering with the externally threaded ends of the adjacent pipe joints or sections 8, and in addition to these fine threads $9^3$ and $9^4$, the tool joint 9 is further provided with the coarse and steeply tapered thread $9^5$, the latter being external on the upper pin member and being internal on the lower box member. The well known function of the tool joint is to permit the stands of the drill stem to be unscrewed from each other at these coarse threads $9^5$ of the tool joints. The coarseness of these threads $9^5$, together with the steepness of their taper, permits quick making and breaking, i. e., screwing and unscrewing, of the threaded joints at this place without appreciable wear on these coarse threads $9^5$. In other words, when the 6000 feet of drill stem indicated in Fig. 1 is drawn up from the well, to replace or resharpen the drill bit 12, as usually occurs every few hours, the various stands of the drill stem are broken only at the coarse threads $9^5$ of the tool joints, and not at the fine threads 11 and 11' of couplings 10, or at the fine threads $9^3$ and $9^4$ of the tool joints. The fine threads just mentioned would soon be destroyed if the drill stem were made and broken there, and to stand this punishment of the frequent making and breaking of the drill stem into stands, is the principal reason for supplying the tool joints 9. In fact, merely because of the fineness of threads 11 and 11' of couplings 10 and of threads $9^3$ and $9^4$ of tool joints 9, these threads make up so tightly in the course of drilling, that they would probably gall and destroy themselves the first time or two that they were unscrewed after heavy drilling, and for this reason it is universal practice to not unscrew the pipe sections at the couplings 10, or at any place other than the coarse threads $9^5$ of the tool joints. I have emphasized this to impress the fact that when the couplings 10 are once mounted in the drill stem they thereafter remain permanently coupled in the stands, that is in the series of four pipe joints, with a tool joint 9 at the extreme ends, so that it is practically impossible to install, or reinstall, protective covers or jackets on these couplings 10 by shrinking or press-fitting unitary cylindrical jackets over these couplings after they are once mounted in the drill stem. This aspect will be referred to again, later.

It will also be noted from Fig. 4, and from Fig. 2, that the external diameter of the conventional tool joints is always greater than the external diameter of the cylindrical couplings 10, this being best indicated by the relation of the projecting lines 9a and 10a in Fig. 4, these lines respectively indicating the external diameters of the tool joints 9 and couplings 10. This relationship of the diameters will also be referred to again, later.

Returning now to Fig. 1, and bearing in mind the difficulty of keeping deep holes absolutely straight, and also of keeping the long drill stems from leaning or whipping about as they rotate in the hole, it is obvious that at various points, as for instance at 2a in Fig. 1, the drill stem, or some part thereof, will bear and rub against the sides of the open hole and make contact therewith, and in addition occasional rocks or boulders as indicated at 2b in Fig. 1, will project into the hole and cause further rubbing against the drill stem, or some part thereof. Obviously this rubbing will mostly come either on tool joints 9 or on couplings 10 because they are of larger diameter than the pipe, and this fact indirectly protects the pipe sections 8 against the wear and rubbing just mentioned. Fig. 3 shows a coupling partly in section, the dotted line 10c indicating the original outline of a new coupling, and the full line 10d indicating the outline of the coupling after same has become worn after a fair period of use in the drill stem. Such a degree of coupling wear as is here indicated is dangerous for many reasons, and gives rise to considerable trouble and expense required in replacing such worn couplings. To give an idea of the importance of this subject, I need merely mention that the mud is pumped into the drill stem through hose 6 on swivel 5 at the top, at pressures frequently exceeding 1000 pounds per square inch, and this high pressure mud, after passing down through the entire drill stem issues from ports 13 of the drill bit 12 at the bottom. The mud there blasts the bit clean and clear of clay and other sticky formations, and it then floats the drillings up to the surface through the hole and well outside the drill stem. Naturally it is difficult enough to make the joints leakproof against these high pressures even when the couplings 10 are new, but when they become worn as shown in Fig. 3, the reduced walls of the coupling naturally stretch radially under the high mud pressure and this immediately allows the mud to leak and escape at high velocity between the coupling threads and the pipe threads. The mud contains some small particles of sand and in view of the high velocity of the leakage, the mud rapidly blasts the external threads of the pipe joints and also the internal threads on the couplings, and thereby destroys rapidly both the couplings and the expensive pipe sections 8. These pipe sections cannot be readily rethreaded in the ordinary sense because only their ends 8', see Fig. 4, have been upset to give the necessary thickness or reenforcement necessary in drill pipe for even the first threading of the pipe. In addition to these leakage problems induced by worn couplings, the latter also introduce general mechanical weaknesses into the entire drill stem, and all this taken together illustrates the importance of preventing wear on the couplings 10, if this can be done in a sound practical manner without introducing other objections that offset the benefits.

It is for these various reasons that I have introduced the coupling jackets that comprise the subject of this invention.

In the drawings these coupling jackets are designated generally by reference numeral 15. Jackets involving the essence of my invention can be made in a variety of forms some of which are shown in the various figures of the drawings. My jackets are made of any hard, tough, rigid abrasion-resisting metal such for instance as iron or steel of various kinds, or hard bronze, or other materials or metals, preferably manganese steel as the latter is noted for its resistance to abrasion when operating in sand, boulders, or the like. Soft pliable materials such as lead or rubber are not serviceable as protective jackets for couplings operating in the open-hole 2, Fig. 1, although covers of such types might be useful for other purposes in other parts of the well. For instance, I wish to emphasize that my coupling jackets 15, Fig. 1, should not be confused with the well-known rubber bumpers or casing protectors 16, also shown in Fig. 1. These rubber casing protectors are mounted on that portion of the drill stem which runs in the permanently installed steel casing 1, which as already indicated may extend down 3,000 ft. or more from the surface of the earth. The purpose of these rubber protectors 16 is principally to protect the well casing 1 from being cut by the tool joints or couplings 9 and 10 respectively during drilling, as such cutting of casing 1 could ruin the entire well by inducing perpetual leakage into the well of the upper fluids that were intended to be sealed off by the casing 1. For reasons just indicated, it would not do to run my hard metallic coupling jackets up in the well casing 1 because they would cut and injure the casing, and likewise it would not do to run the rubber casing protectors 16 in the open hole 2 as they cannot satisfactorily stand the service encountered there, even though this latter is occasionally attempted but with no notable success. In short, the rubber casing protectors 16, whether mounted on the pipe sections 8 or on couplings 10, should be confined to that portion of the drill stem running in the casing 1, and my coupling jackets made of hard tough abrasion-resisting metal should be confined to that portion of the drill stem that runs in the open hole 2. These bumpers or protectors 16 and my jackets 15 are entirely different and distinct mechanisms, and their respective functions are different and distinct, and they should not be confused with each other even though they both happen to be used on the drill stem.

In order to function correctly on the drill stem the external surface of my coupling jacket is substantially a cylindrical wear surface, and has no substantial extensions or protrusions such as flanges, lugs, or large shoulders extending outward therefrom, but small irregularities such as are produced by careless or ragged welding, or by casting data about size, or other data, onto the external surface of the jackets, are disregarded as such minor protrusions are not substantial.

It is noted in connection with Figs. 2 and 4, especially by reference to extension lines 9a and 15a in Fig. 4, that the external diameter of my coupling jacket is made greater than the external diameter of the tool joints 9, and I consider this a feature of my invention for the reason that this excess diameter causes the protective coupling jackets located on each side of the tool joint to take the wear and rubbing against the sides of the open hole without permitting the intervening tool joint 9 to rub against same. This relationship is well illustrated in Fig. 2. Because of it the coupling jackets 15 not only directly protect the couplings 10 by covering them, but also indirectly protect the intermediate tool joints 9 against wear by holding the tool joints off the formation structure 2. Since couplings 10 are always located at the opposite ends of the same pipe sections 8 to which the tool joints 9 are connected, it follows that the tool joints can in this manner be readily, although indirectly, protected by the coupling jackets, provided the jacket diameter exceeds the tool joint diameter. In fact it is proper to say that my coupling jackets 15 are protectors of the tool joints 9 as well as of the couplings 10, even though the protection for the tool joint is indirect while that for the coupling is direct. As far as I know I am the first to propose such indirect protection for the tool joints by applying to the couplings tough metallic jackets of substantially larger diameter than the diameter of the tool joints. The importance of this becomes emphasized when it is remembered that such jackets could not readily be installed on the tool joints 9 themselves, because the latter must be repeatedly screwed and unscrewed from each other as already described, and the tongs and other mechanism that must be applied on or near the tool joints for this purpose would render the installation of jackets over the tool joints undesirable, but my indirect protection of these tool joints that run in the open hole, by means of my tough, rigid metallic jackets on the couplings is entirely practicable and is a substantial contribution to the art. Of course the external diameter of my jackets 15 is less than the diameter of the hole 2 drilled by bit 12, so that the mud and drillings can freely rise to the surface from the bit as already mentioned.

Referring now to the more specific construction of my coupling jacket, I wish to again point out that same can be made in various forms, some of which are illustrated in the accompanying Figures 4, 7, 8 and 9, and all of these, as well as certain other forms and modifications, embrace the essence of my invention.

In the first place my coupling jacket consists essentially of a plurality of sections or parts each of which is of general arcuate shape in cross section and each of which extends longitudinally of the coupling. While such plurality could consist of any number of such arcuate longitudinally extending sections, I find that two such sections are sufficient, and I have shown the same in the drawings and designated them respectively by the reference numerals 15$^b$ and 15$^c$. In all the various forms illustrated, it will be noted that these sections surround the coupling substantially about its entire perimeter and these sections when installed and assembled on the coupling present an external substantially cylindrical wear surface 15$^s$, best noted in Figs. 5 and 6, from which there are no substantial extensions or protrusions extending outward therefrom, such as flanges, lugs, large shoulders, etc., so that this external cylindrical wear face of the jacket will function efficiently in drilling and will not needlessy tear or dig on the sides of the hole, as flanges or lugs would do.

At least at one end, and preferably at both ends, the inner surface of my jackets have inwardly projecting shoulders 15$^d$ which project inward further than the external surface of the coupling, and project a substantial distance along the pipe sections away from the coupling, the purpose of these inwardly extending shoulders being partly to protect the ends of the coupling against wear, and also to prevent the jackets from excessively shifting lengthwise of the coupling in the remote event of failure of other methods employed to prevent such shifting. By tapering inwardly the external surface of the jacket ends over shoulder 15$^d$, as shown at 15$^e$, these jackets and the couplings are neatly guided into any restricted or obstructed portion of the hole.

While I have shown the edges that separate the arcuate jacket sections 15$^b$ and 15$^c$ as extending substantially in a straight line lengthwise of the coupling, these edges could of course extend spirally around the coupling, or in a zigzag manner, or in any other generally longitudinal manner, all this being immaterial, but at some place, or places, or all along their length, I provide that these longitudinally extending edges of the sections 15$^b$ and 15$^c$ should come into reasonably close proximity to each other in order that welding metal 18 can be deposited therebetween to join these arcuate jacket sections together to form a unitized substantially endless cylindrical one-piece jacket as aforesaid. The external surface of this welding metal is preferably substantially flush, and approximately continues the external cylindrical contour of the wear face 15$^s$ of the jacket, moderate irregularities due to rough or careless welding being disregarded.

In ways that will be hereinafter explained, I also efficiently secure the jacket to the coupling in order to prevent relative movement or slip between them.

It will be noted that by making my jacket in the form of a plurality of arcuate longitudinally extending sections as aforesaid, I am able to install my jackets, and to renew the jackets again and again as they wear, on drill pipe couplings while same remain permanently mounted in the drill stem, which could not be done with jackets that consist of a single continuous cylindrical member. Installation of the latter would be impossible because such single piece jackets could not be passed over the larger tool joints 9 that comprise part of the assembled drill stem, and, as was already explained, since the couplings and tool joints when once assembled in the drill stem cannot thereafter be unscrewed because their fine threads would gall and be ruined in attempting such unscrewing, the importance of making my coupling jacket orginally of a plurality of separate arcuate sections for ready installation on the drill stem, becomes apparent. But while such ready installation is thus facilitated, this alone is not enough and before a successful and commercially useful coupling jacket is created, a further feature of my invention must be added, and this is the feature which consists in depositing welding metal between the proximate portions of the longitudinally extending edges of the separate jacket sections to thereby unitize these sections to each other to produce in effect an integral single piece jacket about the coupling, and wherein there is a continuous band of metal, including the welding metal, extending endlessly around the entire jacket so that same cannot under any circumstances come apart in the well. The importance of this feature cannot be overestimated, because the punishment, hard duty, and general pounding that in various ways is imposed upon these jackets and couplings during drilling is such that only such solid one-piece jackets which cannot be knocked apart or off the coupling has any possibility of successful commercial utility as a protective jacket for drill pipe couplings. Other jackets approximately like mine in that they had a plurality of arcuate sections for easy installation on the drill stem couplings have heretofore been proposed but have never reached commercial utility to any appreciable extent for the reason that their arcuate sections were not unitized into a one-piece jacket as mine are, but were merely held together by tongues or other separate parts which created a multi-piece jacket that was wholly inadequate and even dangerous for the required service, and which therefore never went into general use.

While I believe that the paragraph just preceding sets forth my invention in its broadest sense, nevertheless I have developed some further new and useful improvements which I will now refer to.

As already noted, I wish to secure the jacket to the coupling in highly efficient manner to prevent movement or slippage between these parts. To accomplish this effectively is a further important requirement in any successful jacket for drill stem couplings. In my preferred form I accomplish this result by a combination of forces or instrumentalities comprising, first, the direct welding of the unitized jacket to the coupling, to thereby positively attach or unitize the jacket to the coupling, and second, by providing powerful permanent frictional grip between the jacket and the coupling which it embraces. These two instrumentalities cooperate with each other in the following unique manner. It has already been stated that it is preferable in this work to use welding as sparingly as possible, because the high temperatures of welding always involve the possible danger of distorting the coupling, and the coupling threads, to induce leakage. For this reason, welding, especially the kind that operates directly on the body of the coupling, and attaches directly thereto, should be reduced to a minimum, and this desirable result I procure by relying considerably on a powerful frictional grip between the jacket and coupling, this grip being induced in a manner which I will describe later. Obviously, the more there is of such powerful frictional grip, the less of the direct welding of the jacket to the coupling there need be, but on the other hand, since frictional grip is not always dependable, and is not positive, I prefer to use a certain but minimum amount of said welding to supply positive attachment of the jacket to the coupling. In other words, the combined use of both of these instrumentalities results beneficially in minimum risk of distortion or damage to the coupling, and yet assures positive connection and association of the jacket with the coupling, and it helps the coupling in still other ways that will be mentioned later. Further, the less there is of such welding of the jacket to the coupling, the easier it will be cut the jacket away from the coupling when replacement of the worn jacket presently becomes necessary, and anything that facilitates such replacement is advantageous.

While, as just stated, I prefer to secure the jacket to the coupling by the combined use of positive welding and frictional grip, nevertheless, I wish to point out that other features of my improved jacket which have already been described, can be used with good effect, and within the spirit and essence of my invention, without using this combination of positive welding and frictional grip to secure the jacket to the coupling, but by using either the positive welding only, or by using the frictional grip only, or in fact by using any other suitable instrumentalities, and I consider all this to be within the scope of my invention if included within the terms of the appended claims, notwithstanding that for very best results I consider the combined use of the described instrumentalities as best.

Since the manner in which I utilize positive welding to attach the jacket to the coupling, and also the manner in which I induce the permanent frictional grip between the jacket and the coupling, in each case has unique features and characteristics of its own, I will now separately describe each of these instrumentalities in the following paragraphs, with the understanding that my preference is to use them both simultaneously.

Referring first to the use of the positive welding, and remembering that this should be done carefully and sparingly, I wish to point out a feature of my improvement which in general consists in confining this positive welding of the jacket to the coupling, to such parts of the coupling as may be described as its medial parts.

In the form of my invention shown in Fig. 4, this medial positive welding is shown at 18$^a$, and in the form shown in Fig. 7 it is shown within the jacket apertures 18$^b$. Though these apertures are shown circular they may be of any desired shape whatever.

In Fig. 4 this medial welding is shown in its most appropriate position, namely exactly midway between the oppositely tapered coupling threads 11 and 11', i. e., midway between the ends of the coupling. This medial welding, however, need not be exactly midway of the coupling, the only requirement being that it be substantially away from the ends of the coupling where the threads are especially effective in sealing the joints between the coupling and the pipe sections 8. In this way this medial welding, which attaches directly to the coupling, will not needlessly heat and distort the coupling near its ends where the threads are most effective, but by being confined to portions of the coupling away from the ends, this medial welding positively secures and unitizes the jacket to the coupling with least risk to the threads.

In regard to Fig. 4, cross sections through the jacket along lines $X^5$—$X^5$, and $X^6$—$X^6$, are shown respectively in Figs. 5 and 6. By referring to Fig. 5 it is noticed that the longitudinal edges that separate the jacket sections 15$^b$ and 15$^c$ from each other, are relatively close to each other towards the ends of the jacket, the object being that the welding metal 18 can then be readily deposited along and between these relatively close portions of the edges to weld the jacket sections together to unitize them, but without welding the jacket to the coupling in this area. On the other hand, by referring to Fig. 6, it is noticed that the longitudinal edges that separate the jacket sections are relatively further from each other at the center of the jacket which overlies the center of the coupling, i. e., in the area 18$^a$ shown in Fig. 4, the object being to permit the ready deposit of welding material in this area in such manner that the welding material will not only join the jacket sections together to unitize them, but will also positively attach the jacket to the coupling to virtually unitize the jacket to the coupling and prevent movement between them. From this it is clear that the relative closeness of the edges, as shown in Fig. 5 will tend to prevent the high welding temperature from directly attacking the coupling where the coupling threads are most effective, while on the other hand the positive welding of the jacket to the coupling, as shown in Fig. 6, will not injure or distort the effective coupling threads because this latter welding is at a place away from the effective coupling threads.

In this manner, and notwithstanding all the welding, the coupling is protected so it still meets the exacting standards required for couplings.

In Fig. 7 I have indicated the adjacent longitudinally extending edges of the jacket sections as being relatively close to each other from one end of the jacket to the other, the kind of welding described in connection with Fig. 5 being here used throughout the length of the jacket, and the medial welding of the jacket to the coupling being located in the apertures 18$^b$.

This medial welding at 18$^b$ in Fig. 7, and also at 18$^a$ in Fig. 4, happens to be shown exactly at the center of the coupling, but as already indicated latitude in the location of this medial welding is permissible as the intent of the phrase medial welding is merely to indicate that this welding should be so placed (substantially away from the outer ends of the coupling threads, and therefore from the ends of the coupling) as to minimize or eliminate impairment of the coupling threads.

Of course it is not necessary in any of the forms of my invention that the welding metal be supplied all along the edges from one end of the jacket to the other, as it is sometimes sufficient to supply the welding metal only at intervals along the jacket, blank spaces being left between these intervals, and at these blank spaces the edges of the sections could be close to each other or spread apart.

While the application of the welding in the unique manner described in the last few paragraphs, is in my judgment a feature of improvement and invention which contributes the best obtainable results, nevertheless other features of my invention hereinbefore described can be used without using the particular welding improvements set forth in the preceding paragraphs. To emphasize this I have selected the form of my invention shown in Fig. 8, to illustrate welding material 18$^8$ deposited all along the separating edges of the jacket sections 15$^b$ and 15$^c$ in the manner described in connection with Fig. 6. That is, the separating edges of the jacket sections are spread substantially apart from end to end of the jacket and welding material is deposited to fill the entire space between the edges in such manner as to unitize the jacket sections to each other, and to positively weld the jacket to the coupling 10 from end to end and at both of the diametrically opposite sides of the coupling. This preserves and utilizes certain basic aspects of my invention herein previously described, although this form exposes the coupling to risk of distortion and does not utilize my improved welding described in connection with Figs. 4 and 7. It happens that Fig. 8 discloses a still further feature of improvement not yet mentioned, but since the presence or absence of same does not influence the matters already recited in this paragraph, the description of that other feature will be deferred to a later point in this specification.

Referring now to the previously mentioned powerful permanent frictional grip between the jacket sections and the coupling, which supplements and permits reduction in the amount of positive welding of the jacket to the coupling, I wish to call attention to Figs. 10, 11 and 12. This permanent frictional grip can be induced in various ways, but one good way consists in installing the jacket sections on the coupling by use of any appropriate and sufficiently powerful clamp, a form of which is illustrated in Fig. 10. This clamp may consist of parts 20$^a$ and 20$^b$ clamped together in any suitable manner as by a plurality of bolts 21, using as many of these bolts as may be needed, and each of these bolts being provided with fastening nuts 22. As indicated in Fig. 10, the jacket sections 15$^b$ and 15$^c$ are put in place in the clamp on coupling 10 while the latter is part of the drill stem, and by then tightening nuts 22 the arcuate jacket sections will be drawn down tightly over the coupling 10. The jacket sections, coupling and pipe 8 will thus be put under great compression all around. Also, the adjacent edges of the jacket sections will to a degree be drawn closer to each other. With the parts thus powerfully clamped together, the welding metal is then deposited in the locality 18$^c$, Fig. 10, to unitize the jacket sections 15$^b$ and 15$^c$ together, and to weld the jacket to the coupling. Thereafter the clamp is removed, but the compression of the jacket on the coupling will not disappear but will remain permanently therein because the welding at 18$^c$ will not allow the jacket sections to draw away from each other to relieve the compression. In other words, in the final unitized one-piece jacket, although the sections are constantly straining against the welding at 18$^c$ in an effort to draw apart, nevertheless this welding prevents such drawing apart, and there is therefore set up a permanent hoop tension extending around the unitized jacket, and this produces inwardly directed resultant forces which continually pull the jacket parts radially inward to frictionally grip the coupling. This frictional grip materially aids in preventing movement or slip between the jacket and coupling during drilling, and this frictional grip may even be sufficient of itself to prevent such slip without the aid of any positive welding of the jacket to the coupling.

This phenomena of hoop tension induced in the above manner, will be readily understood without much additional explanation. In Fig. 12 the oppositely extending arrows 23, of which several are shown around the jacket, indicate that this hoop tension has in well known manner been transmitted to and therefore exists at each point around the hoop, and the arrows 24 indicate the resultant forces set up by this hoop tension. It will be apparent that these resultant forces 24 tend continuously to pull the parts of the jacket inwardly to produce the frictional grip referred to. Of course Fig. 12 is intended to be diagrammatic and illustrative only, and in actual practice it is not likely that the forces 23 and 24 will be uniform as shown. These forces will in various ways be disturbed or distorted as by the fact that the endless hoop, comprising the unitized cylindrical jacket, may at places be positively welded to the coupling, but this principle of hoop tension and frictional grip will be present, even though in distorted manner, if the jacket sections are clamped to the coupling before welding, as described.

Either in connection with the clamp shown in Fig. 10, or without any clamp whatever, the above described hoop-tension, and resulting frictional grip, can be created by heating the jacket sections $15^b$ and $15^c$ immediately before placing them on coupling 10. The hot jacket sections are of course expanded, and by then welding them together as quickly as possible, and before the coupling is substantially heated by the hot jacket, the jacket will then contract as it cools and will powerfully grip the coupling frictionally as a result of the general principle of contraction during cooling.

As a further improvement for facilitating the frictional grip and making it more uniform around the coupling, I call attention to Fig. 11, showing the radius of the inner surface $15^x$ of the jacket sections $15^b$ and $15^c$, as smaller than the radius of the outer surface of the coupling 10; so that when the jacket sections $15^b$ and $15^c$ are pressed down onto the coupling by means of the clamp shown in Fig. 10, the jacket sections will then bear down on the coupling more evenly all around, including the portions adjacent the longitudinal edges of the sections, as at $15^z$, this being due to the radial springiness of the sections procured by making them of less internal radius than the external radius of the coupling. In actual practice, the difference in radii will be smaller than that indicated in Fig. 11, the latter being greatly exaggerated for purposes of illustration.

In Fig. 9 I have indicated another improvement which has general utility in connection with my invention, but which has especial utility when frictional grip only is depended upon for securing the jacket to the coupling to prevent slip. This improvement comprises the friction-producing material 25, see Fig. 9, inserted between coupling 10 and the jacket sections before the latter are pressed together and welded. This friction-producing material 25 preferably surrounds the entire coupling, and may be a layer of brake lining, asbestos, canvas, fabric, rubber, or other friction-producing material, or it may comprise a layer of powdered rosin, or anything that will materially increase the frictional grip above that of mere metal to metal contact.

By selecting for this friction-producing material 25, something that is moderately flexible like rubber, canvas, or brake lining, this material will adapt itself to any irregularity between the jacket and coupling, and this is beneficial.

The form of my jacket shown in Figure 9 also illustrates the outer surface $15^s$ of my jacket as bellied outward at its middle portion, or in other words the outer surface of the jacket is not truly cylindrical in an exact mathematical sense. However, I consider the external wear face of even a jacket such as this to be substantially cylindrical, because I do not use this term in its strict mathematical sense.

In Fig. 4, the interior surface of the coupling jacket is shown as bearing and fitting nicely on both ends of the coupling, but between these bearing places the interior surface of the jacket is relieved as at $15^r$. In addition to facilitating a good fit over the coupling ends, this relief provides a further advantage when the jacket sections are put on under pressure, as by the clamp in Fig. 10. This advantage consists in concentrating the previously described inwardly pulling forces 24 of the jacket, see Fig. 12, onto those parts of the coupling which overlie the coupling threads, and in this way the coupling threads are reinforced. When one considers that during drilling there are forces constantly stretching or expanding the coupling radially outward, such as the extremely high fluid pressures in the drill stem, and the constant tendency of the pipe sections 8 to screw further into the coupling during drilling, the advantage of giving to the coupling maximum reinforcement from the jacket, especially over the coupling threads, becomes apparent, and this is facilitated by the concentration of forces induced by the relief 15, as just described.

I now wish to again refer to Fig. 8, and especially to a feature illustrated therein and already briefly referred to. Like several other features and improvements already described, this feature is alternative, and may be used or not as desired. This feature relates to the fact that it is sometimes advantageous to deposit welding material 26 around both ends of the jacket to securely join or unitize the jacket to both adjoining pipe sections 8. Under some conditions it is very helpful to do this. As already mentioned in connection with Fig. 1, the rapidly rotating drill stem for various reasons tends to bend and whip about during operation, and this imposes unusual strains on the threads that join the coupling and neighboring pipe section 8 together. Fig. 1a, found on the second sheet of the drawings, diagrammatically and in exaggerated manner illustrates this phenomenon of the bending or whipping of the drill stem. When subject to such bending the coupling and pipe threads of course suffer unusual strain. After due consideration it is apparent that the ability of the coupling threads to resist these great bending strains set up in the drill stem, is quite dependent on the length of thread engagement between the pipe and coupling, i. e., the distance from $l$ to $m$ in Fig. 4. The greater this distance the better the threads can resist the bending. It may be said that during bending the pipe and its threads tend to snap out of the coupling because the pipe threads tend to rotate around central point $n$, found on the axis of the coupling midway between $m$ and $l$, in Fig. 4. Now since the jacket as shown in the figures, extends along the pipe substantially beyond the ends of the coupling, it follows that if the welding 26 at the coupling ends, see Fig. 8, is added in sufficient amount to firmly attach or unitize the jacket ends to the pipe sections 8, then this welding tends to transmit either all or a portion of the bending strains from upper to lower pipe sections 8 through the jacket 15, and this obviously relieves the coupling threads, either completely or partially, from the tremendous strain which such bending of the drill stem imposes. In Fig. 8, it might be said that the strains that tend to snap the pipe threads out of the coupling are spread apart from $m'$ to the outer point $l'$ of the welding 26, and since the distance from $m'$ to $l'$ in Fig. 8, is substantially greater than the distance from $m$ to $l$ in Fig. 4, and since the tendency to rotate around $n'$ (this being the midpoint between $m'$ and $l'$ in Fig. 8) is resisted better by the structure shown in Fig. 8, than the tendency to rotate around point $n$ is resisted in Fig. 4, it is apparent that this welding 26 of the jacket to the adjacent pipe sections 8 around the outer ends of the jacket, is a material contribution in withstanding the bending strains in drill stems. In addition to increasing the dependability of the drill stem, this end welding 26 enables the drill pipe safety to carry higher mud pressures without risk of leakage than is otherwise the case. To further promote the last named benefit, the end welding 26 can be made so complete and secure that in itself it becomes a seal against leakage, to supplement the sealing power of the coupling threads. In this case the longitudinal edges that separate the original jacket sections should be welded up tightly to complete the seal. In concluding this aspect of my invention I wish to again point out that though advantages are procured by using this end welding 26, nevertheless certain other advantages which are sometimes desirable are lost by use of it, and consequently it is left optional as to whether this end welding 26 is used or not, according to circumstances and the preferences of the driller. Also, whether welding 18⁸ used in Fig. 8, joins the jacket positively to the coupling as previously stated, or whether it only joins the jacket sections together, is also left optional with the user.

In connection with my invention, I prefer electric welding to torch welding. Also, while I have shown the end shoulders 15ᵈ in all the figures, these are not a necessary part of the broadest aspect of my invention, although I prefer to include them for the benefits they give, as already described.

This now completes the description of my invention, and since the operation and function of its various parts have already been described, it is believed that the operation and use of my jacket will be thoroughly understood. However, to summarize briefly, will state that when the drill pipe couplings, which according to present day practice are practically all unprotected, are covered with my protecting jackets, then the large scale troubles and expense continuously encountered today because of worn couplings will be eliminated, or at least greatly reduced, and while the wear will then be transferred to the jackets, a worn jacket is not nearly so serious as a worn coupling because the jacket does not primarily partake of the difficult duties imposed on the coupling, and furthermore, when my jacket is worn it can be readily replaced, whereas worn couplings cannot be easily replaced because they gall and destroy the fine threads of the drill pipe when an effort is made to unscrew them. Taken all in all, my invention is an important contribution in mitigating a very troublesome situation that is continually plaguing the art of drilling deep wells today.

In this specification, and in the appended claims, where I have recited that the jacket or jacket sections "surround" or "externally surround" the coupling, or words to that effect, I intend to include in these words only the idea that the jacket or jacket sections are disposed radially outward of and about the exterior cylindrical surface of the coupling, as that is the feature and portion of the jacket that provides the substantial protection to the coupling against wear, and I do not include in these words the idea of the inwardly projecting shoulders 15ᵈ, Figs. 4, 8, 9, etc., formed at the ends of the jackets, even though these shoulders might in a sense lie about the ends of the coupling. This latter is a helpful feature, but not so important as the other, and I do not include it in the words or phrases just referred to.

Also, it is obvious that the inwardly acting forces set up by the hoop tension, and that act to continually pull the jacket sections firmly inward against the coupling, as hereinbefore described in connection with Figs. 10, 11 and 12, can be set up in connection with any of the forms of my invention, that is, the forms shown in Figs. 4, 7, 8, 9, and also other forms not specifically illustrated or described herein. Also, it is obvious that other features and portions of my invention and jacket can be used separately and apart from these inward pulling forces due to hoop tension, and that the latter can be omitted without departing from the spirit or scope of such other parts or features of my invention.

I claim:

1. A rigid metallic jacket for a drill pipe coupling of the cylindrical type that has two internally threaded ends, said jacket comprising a plurality of arcuate longitudinally extending sections of rigid metal externally surrounding the coupling and presenting an external substantially cylindrical wear surface having no substantial protrusion extending outward therefrom, the longitudinal edges of the adjacent jacket sections being relatively close to each other where they overlie the threaded end portions of the coupling to facilitate the deposit of welding metal along these relatively close portions of said edges to weld the sections together without welding them to the coupling near the threaded end portions of the coupling, but said longitudinal edges of the adjacent jacket sections being relatively further from each other where they overlie the medial portions of the coupling away from the coupling ends to facilitate the deposit of welding metal in this medial area to weld said sections to the coupling to make the jacket a unitary part of the coupling.

2. In combination with an internally threaded cylindrical pipe coupling, a rigid metallic jacket externally surrounding said coupling, said jacket comprising a plurality of arcuate sections of rigid metal, welding material deposited between said sections to join said sections securely together without welding them to the coupling adjacent the ends of the coupling, and welding material attached to said jacket and to said coupling medially of said coupling and away from the ends thereof to positively unite said jacket to said coupling to prevent slip therebetween.

3. In combination with an externally cylindrical pipe coupling having two internally threaded ends, a rigid metallic jacket externally surrounding said coupling and presenting an external substantially cylindrical wear surface without any substantial protrusion extending outward therefrom, said jacket comprising a plurality of arcuate sections of rigid metal, and welding material attached to said jacket and to said coupling to positively unite said jacket to said coupling to prevent slip therebetween, said welding material which thus positively unites said jacket to said coupling being confined to only substantially medial portions of said coupling.

4. In combination, an externally cylindrical pipe coupling having internal coupling threads, and a rigid metallic jacket externally surrounding said coupling, said jacket comprising a plurality of arcuate sections of rigid metal, welding material attached to said sections to join the sections together to form an endless substantially cylindrical jacket surrounding the coupling and having a substantially cylindrical external wear surface without any substantial protrusion extending outward therefrom, said jacket sections when thus joined together to form said endless substantially cylindrical jacket having within and between themselves substantial forces acting to continually pull the jacket sections inward to frictionally grip the coupling with a powerful frictional grip to resist slippage of the jacket on the coupling.

5. In combination, an externally cylindrical pipe coupling having two internally threaded ends, and a rigid metallic jacket externally surrounding said coupling, said jacket comprising a plurality of arcuate longitudinally extending sections of rigid metal, welding material attached to said sections to join the sections together to form an endless substantially cylindrical jacket surrounding the coupling and having a substantially cylindrical external wear surface without any substantial protrusion extending outward therefrom, said jacket sections when thus joined together to form said endless substantially cylindrical jacket having within and between themselves substantial forces acting to continually pull the jacket sections inwardly to frictionally grip the coupling, the internal surface of said jacket being adapted to bear on the externally cylindrical surface of the coupling at places in the vicinity of both ends of the coupling, but said internal surface of the jacket being relieved between said bearing places to thereby concentrate said inwardly pulling forces of the jacket onto said bearing places in the vicinity of both ends of the coupling.

6. In combination, an externally cylindrical pipe coupling having two internally threaded ends, and a rigid metallic jacket externally surrounding said coupling, said jacket comprising a plurality of arcuate longitudinally extending sections of rigid metal, welding material deposited between said sections to join the sections together to form an endless substantially cylindrical jacket surrounding the coupling and having a substantially cylindrical external wear surface without any substantial protrusion extending outward therefrom, said jacket sections when thus joined together to form said endless substantially cylindrical jacket having within and between themselves substantial forces acting to continually pull the jacket sections inward to frictionally grip the coupling, the internal surface of said jacket being adapted to bear on the externally cylindrical surface of the coupling at places in the vicinity of both ends of the coupling, but said internal surface of the jacket being relieved between said bearing places to thereby concentrate said inwardly pulling forces of the jacket onto said bearing places in the vicinity of both ends of the coupling, and welding metal deposited to securely and positively join the jacket to the coupling.

7. In combination with an externally cylindrical drill pipe coupling having two alined oppositely directed internal pipe threads, a coupling jacket comprising a plurality of arcuate longitudinally extending sections of rigid metal, welding material attached to and deposited between said sections to join said sections securely together but said welding material being free of said coupling, and other welding material attached to said jacket sections and to the external cylindrical surface of said coupling medially of said two alined oppositely directed internal pipe threads to positively unite said jacket to said coupling to prevent slip between them.

8. In combination with an externally cylindrical drill pipe coupling having two internally threaded ends, a coupling jacket comprising a plurality of arcuate longitudinally extending sections of rigid metal, welding metal attached to and deposited between said sections to join said sections securely together but said welding metal being free of said coupling at places overlying the said two internally threaded of the coupling, and welding material attached to said jacket sections and to the externally cylindrical surface of said coupling approximately medially thereof to positively unite said jacket to said coupling to prevent slip therebetween.

9. The combination with an internally threaded cylindrical drill pipe coupling and the two adjoining externally threaded pipe sections joined by said coupling, of a rigid metallic jacket externally surrounding said coupling, said jacket comprising a plurality of arcuate sections of rigid metal, welding metal attached to said jacket sections to secure them to each other, said jacket having an external substantially cylindrical wear surface which has no substantial protrusion extending radially outwardly therefrom, said jacket also having at both ends terminal portions that project longitudinally outward beyond both ends of the coupling, and welding metal attached to said terminal portions of the jacket and to both of said adjoining pipe sections to securely join said pipe sections together through the last said welding material and through said jacket.

10. The combination with an internally threaded cylindrical drill pipe coupling and the two adjoining externally threaded pipe sections joined by said coupling, of a rigid metallic jacket externally surrounding said coupling, said jacket comprising a plurality of arcuate sections of rigid metal, welding metal attached to said jacket sections to securely join them to each other to form substantially a one-piece jacket, said jacket having an external substantially cylindrical wear surface which has no substantial protrusion extending radially outwardly therefrom, said jacket also having at both ends terminal portions that project longitudinally outward beyond both ends of the coupling and that extend inwardly further than the external surface of the coupling, and welding metal attached to the outer ends of said jacket terminal portions and to said two adjoining pipe sections to join the outer ends of the jacket to said two adjoining pipe sections respectively.

11. The combination with an internally threaded cylindrical drill pipe coupling and the two adjoining externally threaded pipe sections joined by said coupling, of a rigid metallic jacket externally surrounding said coupling, said jacket comprising a plurality of arcuate sections of rigid metal, welding material attached to said jacket sections and to said coupling to securely join the jacket sections to the coupling, said jacket having an external substantially cylindrical wear surface which has no substantial protrusion extending radially outwardly therefrom, said jacket also having at both ends terminal portions that project longitudinally beyond both ends of the coupling, and welding material attached to said terminal portions of the jacket and to both of said adjoining pipe sections to securely join said pipe sections together through the last said welding material and through said jacket.

ROBERT ALEXANDER STEPS.